US010200840B2

(12) United States Patent
Xu (10) Patent No.: US 10,200,840 B2
(45) Date of Patent: Feb. 5, 2019

(54) METHOD, APPARATUS AND SYSTEM FOR UPDATING MACHINE TYPE COMMUNICATION DEVICE GROUP ACTIVATION INFORMATION (71) Applicant: ZTE CORPORATION, Shenzhen (CN)

(72) Inventor: Hui Xu, Shenzhen (CN)

(73) Assignee: XI'AN ZHONGXING NEW SOFTWARE CO., LTD, Shaanxi (CN)

(*) Notice: Subject to any disclaimer, the term of this patent is extended or adjusted under 35 U.S.C. 154(b) by 24 days.

(21) Appl. No.: 15/325,631

(22) PCT Filed: Sep. 15, 2014

(86) PCT No.: PCT/CN2014/086569
§ 371 (c)(1),
(2) Date: Jan. 11, 2017

(87) PCT Pub. No.: WO2015/154380
PCT Pub. Date: Oct. 15, 2015

(65) Prior Publication Data
US 2017/0150293 A1 May 25, 2017

(30) Foreign Application Priority Data
Jul. 14, 2014 (CN) .......................... 2014 1 0332283

(51) Int. Cl.
*H04W 4/70* (2018.01)
*H04W 76/18* (2018.01)
(Continued)

(52) U.S. Cl.
CPC ............... *H04W 4/70* (2018.02); *H04W 4/06* (2013.01); *H04W 4/08* (2013.01);
(Continued)

(58) Field of Classification Search
CPC ......... H04W 4/70; H04W 4/005; H04W 4/08; H04W 72/005; H04W 4/12; H04W 4/20;
(Continued)

(56) References Cited

U.S. PATENT DOCUMENTS 9,560,162 B2 * 1/2017 Foti ..................... H04L 63/0281
2012/0207094 A1 * 8/2012 Liao ......................... H04W 4/70
370/328

(Continued)

FOREIGN PATENT DOCUMENTS

CN 102647689 8/2012
CN 103096264 5/2013
(Continued)

OTHER PUBLICATIONS

Extend European Search Report for EP 14888942.1, completed by the European Patent Office on May 22, 2017 All together 11 Pages
(Continued)

*Primary Examiner* — Chi H Pham
*Assistant Examiner* — Weibin Huang
(74) *Attorney, Agent, or Firm* — Plumsea Law Group, LLC (57) ABSTRACT A method, device and system are described for updating triggering information of an MTC device group. The method includes: an SCS is connected with a BM-SC through a GCS AS, and sends a request message for updating triggering information of the MTC device group to the BM-SC; and the BM-SC performs a corresponding operation on group triggering information to be updated, and sends a response message of updating success to the SCS after completing the corresponding operation if the group triggering information to be updated has not been sent to the MTC device group and a valid time of the group triggering information to be updated has not been exceeded; and sends a response
(Continued)

message of updating failure to the SCS if the valid time of group triggering information to be updated has been exceeded or group triggering information to be updated has been sent to the MTC device group.

9 Claims, 5 Drawing Sheets

(51) Int. Cl.
  *H04W 76/36* (2018.01)
  *H04W 76/40* (2018.01)
  *H04W 4/06* (2009.01)
  *H04W 72/00* (2009.01)
  *H04W 74/06* (2009.01)
  *H04W 28/02* (2009.01)
  *H04W 4/08* (2009.01)
  *H04W 4/12* (2009.01)
  *H04W 4/20* (2018.01)

(52) U.S. Cl.
  CPC ..... *H04W 28/0215* (2013.01); *H04W 72/005* (2013.01); *H04W 74/06* (2013.01); *H04W 76/18* (2018.02); *H04W 76/36* (2018.02); *H04W 76/40* (2018.02); *H04W 4/12* (2013.01); *H04W 4/20* (2013.01)

(58) Field of Classification Search
  CPC . H04W 28/0215; H04W 74/06; H04W 76/18; H04W 76/36; H04W 76/40
  See application file for complete search history.

(56) References Cited

U.S. PATENT DOCUMENTS

| | | | | |
|---|---|---|---|---|
| 2013/0044646 A1* | 2/2013 | Qu | ...................... | H04M 15/765 370/259 |
| 2013/0070710 A1* | 3/2013 | Guo | ...................... | H04W 4/005 370/329 |
| 2013/0155954 A1* | 6/2013 | Wang | ...................... | H04W 4/70 370/328 |
| 2014/0112251 A1* | 4/2014 | Kim | ...................... | H04W 4/70 370/328 |
| 2015/0201311 A1* | 7/2015 | Zhang | ...................... | H04W 4/08 455/466 |

FOREIGN PATENT DOCUMENTS

| | | |
|---|---|---|
| CN | 103517415 | 1/2014 |
| EP | 2549810 | 11/2011 |
| EP | 2894884 | 9/2012 |
| WO | 2014027740 | 2/2014 |
| WO | 2014047839 | 4/2014 |
| WO | 2014049418 | 4/2014 |

OTHER PUBLICATIONS

3GPP TR 23.887 V12.0.0 (Dec. 2013),151 Pages, "3rd Generation Partnership Project; Technical Specification Group Services and System Aspects; Study on Machine-Type Communications (MTC) and other mobile data application communication enhancements (Release 12 )".

"3GPP TS 22.278 V10.2.0 (Sep. 2010), 26 Pages,""3rd Generation Partnership Project; Technical Specification Group Services and System Aspects; Service requirements for the Evolved Packet System (EPS) (Release 10)".

"3GPP TS 22.368 V11.1.0 (Mar. 2011), 23 Pages,""3rd Generation Partnership Project; Technical Specification Group Services and System Aspects; Service requirements for Machine-Type Communications (MTC); Stage 1 (Release 11)".

"3GPP TS 23.401 V9.0.0 (Mar. 2009), 225 Pages,""3rd Generation Partnership Project; Technical Specification Group Services and System Aspects; General Packet Radio Service (CPRS) enhancements for Evolved Universal Terrestrial Radio Access Network (E-UTRAN) access (Release 9)".

International Search Report for PCT/CN2014/086569, English Translation attached to original, Both completed by the Chinese Patent Office on Mar. 13, 2015, All together 5 Pages.

* cited by examiner

METHOD, APPARATUS AND SYSTEM FOR UPDATING MACHINE TYPE COMMUNICATION DEVICE GROUP ACTIVATION INFORMATION

CROSS-REFERENCE TO RELATED APPLICATION

This application is the U.S. national phase of PCT Appln. No. PCT/CN2014/086569 filed Sep. 15, 2014 which claims priority to Chinese Application No. 201410332283.X filed Jul. 14, 2014, the disclosures of which are incorporated in their entirety by reference herein.

TECHNICAL FIELD

The present disclosure relates to a wireless communication technology, and more particularly to a method, device and system for updating triggering information of a Machine Type Communication MTC device group.

BACKGROUND

Machine to Machine M2M refers to all technologies and means for establishing connections between machines. The concept of the M2M has appeared in the 1990s, but only in a theory stage. After the year of 2000, along with development of a mobile communication technology, it is impossible to implement networking of machine equipment by virtue of the mobile communication technology. An M2M service appeared on the market in the year of about 2002, and was rapidly developed into a focus of attention of many communication equipment suppliers and telecommunication operating companies in subsequent several years. At present, the number of machines throughout the world is far larger than the number of people, so it may be foreseen that the M2M technology has a broad market prospect.

Researches on M2M communication application scenarios show that providing M2M communication on a mobile network has a potential market prospect. However, the M2M service makes many new requirements on a system, and in order to enhance competitiveness of the mobile network on this aspect, it is necessary to optimize the existing mobile network to support M2M communication more effectively.

A related mobile communication network is mainly designed for Human to Human H2H communication, but is not optimized enough for M2M and man-to-machine communication. In addition, how an operating company provides an M2M communication service with low cost is also a key of successful deployment of M2M communication.

Based on the abovementioned conditions, it is necessary to research a solution in which the mobile network supports the M2M communication, and the solution is required to maximally reuse an existing network and reduce influence of massive M2M communication on the network and complexity in operation and maintenance.

At present, competition at the telecommunication market becomes increasingly fierce, and charges are continuously reduced, and a profit space of the operating companies is continuously narrowed, and the man-based communication market is becoming increasingly saturated, so the M2M is a new development opportunity for the operating companies.

In order to effectively utilize a mobile network resource, the 3rd Generation Partnership Project 3GPP puts forward an MTC, i.e. a service of M2M and machine-to-man communication, whose service range far exceeds that of conventional H2H communication, and MTC is greatly different from an H2H communication mode in terms of access control, charging, security, Quality of Service QoS and a service mode and the like.

In a 3GPP Evolved Packet System EPS architecture, an EPS includes a Radio Access Network RAN (such as a Universal Mobile Telecommunication System UMTS Terrestrial Radio Access Network UTRAN, an Evolved UTRAN E-UTRAN and a Global System for Mobile Communications/Enhanced Data rates for GSM Evolution (referred as GSM/EDGE) RAN) and a core network. For example, an Evolved Packet Core EPC includes network elements such as a Mobility Management Entity MME, a Serving Gateway, a Packet Data Network PDN Gateway PGW, etc., and a General Packet Radio Service GPRS core network includes network elements such as a Serving GPRS Supporting Node SGSN etc.; and the E-UTRAN includes an Evolved Node B eNB.

MTC device triggering is one of basic requirements on an MTC system, and a problem concerned by the requirement is that: a manner that an MTC server initiates a polling may be adopted for communication to control communication of an MTC device, and the MTC server is also required to poll data from the MTC device sometimes for communication initiated by the MTC device. If the MTC server fails in query or an Internet Protocol IP address of the MTC device is unavailable, the MTC server may establish communication with the MTC device by MTC device triggering. If the MTC device may not be triggered by a network, the network reports to the MTC server that the MTC device is failed to be triggered, and MTC device triggering is implemented through signaling of the control plane in 3GPP.

MTC device triggering includes Mobile Oriented MO and Mobile Terminating MT services, namely, the MTC device triggering includes information sending or receiving by the MTC device.

Figure 1:
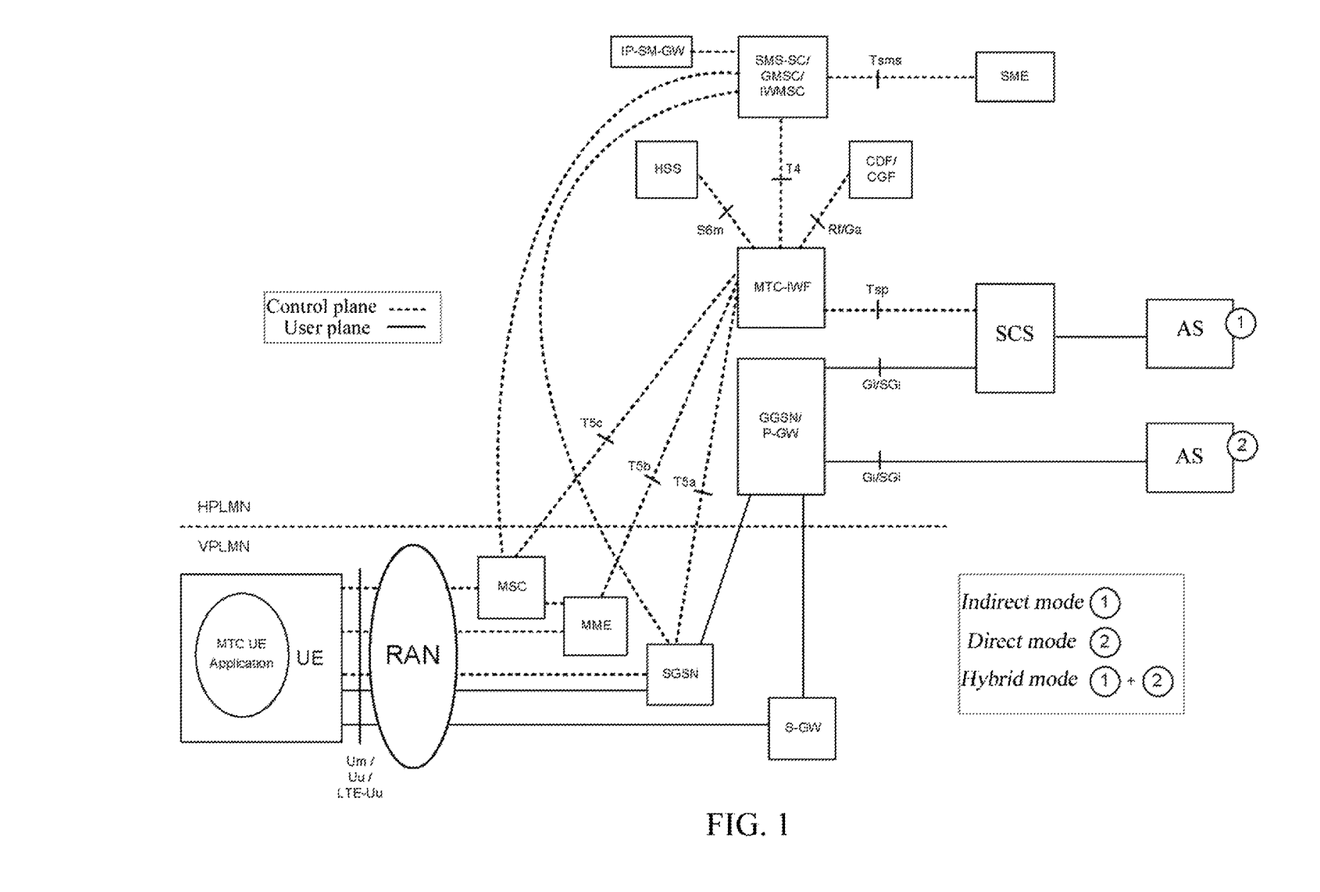
FIG. 1 is a schematic diagram of an MTC architecture in 3GPP in a related art.

In order to implement effective transmission of an MTC device triggering request, a proposed solution includes that: MTC device triggering information is sent through a T4 interface, or the MTC device triggering information is sent through a signaling of a control plane via a T5 interface, or the MTC device triggering information is sent through a Gi/SGi interface on a user plane. For the manner of sending the MTC device triggering information through the signaling of the control plane, the MTC server sends the signaling of the control plane including the MTC device triggering information to a network node, and the network node analytically processes the MTC device triggering information in the signaling of the control plane, and then sends the MTC device triggering information to User Equipment UE. An MTC architecture in 3GPP is shown in FIG. 1. On the user plane, an MTC application device connected with an MTC user communicates with an MTC server through an Application Programming Interface API, or directly communicates with a Gateway GPRS Support Node/PGW/ Evolved Packet Data Gateway, GGSN/PGW/EPDG in a 3GPP network through the Gi/SGi interface, and the MTC server communicates with the GGSN/PGW/EPDG through an MTCi interface, and the GGSN/PGW/EPDG communicates with UE through an RAN. On the control plane, the MTC server sends the signaling of the control plane including MTC device triggering information to an MTC InterWorking Function MTC-IWF through an MTCsp interface or sends the signaling of the control plane including the MTC device triggering information to a Short Message Service-Service Center/IP-Short-Message-Gateway, SMS-SC/IP-SM-GW, through an MTCsms interface, and the MTC-IWF or the SMS-SC/IP-SM-GW sends the signaling of the control plane to an MME/SGSN or a Gateway Mobile-services Switching Center (MSC) for Short Message Service SMS-GMSC or an SMS router or an MSC or a Visitor Location Register VLR, and further sends it to the UE through the RAN, herein the MME/SGSN may also obtain the signaling of the control plane from a Home Subscriber Server HSS or a Home Location Register HLR through a Gr/S6a/S6d interface.

An MTC device grouping requirement is made in 3GPP TS22.368, for example, an MTC server is intended to collect state information of multiple MTC devices, including that: a system associates an MTC device with a single MTC group; each group-based MTC function is applicable to each member in the MTC group; and an Identifier of the MTC group in the 3GPP network is unique.

Figure 2:
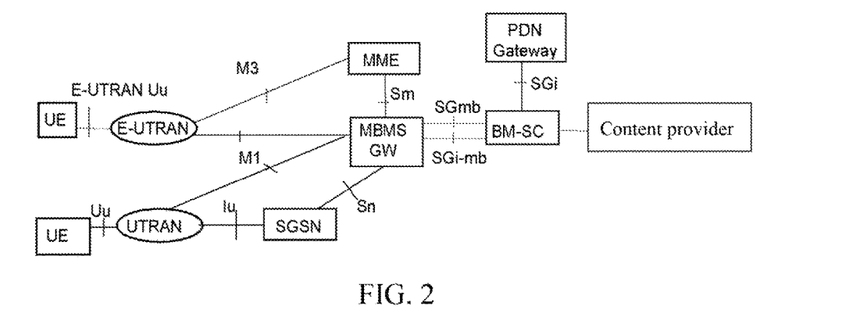
FIG. 2 is a frame diagram of an MBMS system in the related art.

A Multimedia Broadcast Multicast Service MBMS is a technology of sending data from one data source to multiple targets, implements sharing of a network (including core network and access network) resource, and improves a utilization rate of the network resource (particularly an air interface resource). An MBMS in 3GPP Rel-10 adopts a Multicast Control Channel MCCH change notification (called MCCH notification hereinafter) mechanism, that is, a change of the MCCH is indicated on a Physical Downlink Control Channel PDCCH by virtue of a specified MBMS-Radio Network Temporary Identifier M-RNTI and Downlink Control Information DCI, and the change here is only for a session start or counting request event, that is, a network side will send an MCCH notification message only when the session start or counting request event happens. FIG. 2 is a schematic diagram of a system frame of an MBMS.

Each piece of triggering information of the MTC device group has a valid time, that is, the group triggering information is valid within the valid time, and when the time is exceeded, the group triggering information is discarded. There is yet no solution if a server (a group triggering information sending end) is required to update the group triggering information within the valid time.

SUMMARY

A technical problem to be solved by the present disclosure is to provide a solution of updating triggering information of an MTC device group, to realize a requirement of updating group triggering information in a 3GPP network.

In order to solve the problem, the present disclosure provides a method for updating triggering information of an MTC device group, which includes that:

a Service Capability Server SCS is connected with a Broadcast Multicast Service Center BM-SC through a Group Communication Service Application Server GCS AS, and sends a request message for updating the triggering information of the MTC device group to the BM-SC; and the BM-SC performs a corresponding operation on group triggering information to be updated, and sending a response message of updating success to the SCS by the BM-SC after completing the corresponding operation if the group triggering information to be updated has not yet been sent to the MTC device group and a valid time of the group triggering information to be updated has not been exceeded; and sends a response message of updating failure to the SCS if the valid time of the group triggering information to be updated has been exceeded or the group triggering information to be updated has been sent to the MTC device group.

Alternatively, the request message for updating the triggering information of the MTC device group includes an updating Identifier ID for indicating an updating operation type;

the updating operation type includes any one of the following: replacement and cancelation;

when the updating operation type is the replacement, a message body of the request message for updating the triggering information of the MTC device group further includes: new group triggering information;

the step that a corresponding operation is performed on the group triggering information to be updated includes that:

the group triggering information to be updated is replaced with the new group triggering information when the updating operation type is the replacement; and the group triggering information to be updated is deleted when the updating operation type is the cancelation.

Alternatively, when the updating operation type is the replacement, the request message for updating the triggering information of the MTC device group further includes: a valid time of the new group triggering information; and after the step that the response message of updating failure is sent to the SCS, the method further includes that:

the new group triggering information is sent to the MTC device group within the valid time of the new group triggering information, and the SCS is notified after the new group triggering information is sending successfully.

The present disclosure further provides a method for updating triggering information of an MTC device group, which includes that:

a BM-SC judges whether group triggering information to be updated has been sent to an the MTC device group or not and whether a valid time of the group triggering information to be updated has been exceeded or not after receiving a request message of for updating the triggering information of the MTC device group, which is sent by an SCS; and the BM-SC performs a corresponding operation on the group triggering information to be updated, and sends a response message of updating success to the SCS after completing the corresponding operation if the group triggering information to be updated has yet not been sent to the MTC device group and the valid time of the group triggering information to be updated has not been exceeded; and the BM-SC sends a response message of updating failure to the SCS if the valid time of the group triggering information to be updated has been exceeded or the group triggering information to be updated has been sent to the MTC device group.

Alternatively, the request message for updating the triggering information of the MTC device group includes an updating ID for indicating an updating operation type;

the updating operation type includes any one of the following: replacement and cancelation;

when the updating operation type is the replacement, a message body of the request message for updating the triggering information of the MTC device group further includes: new group triggering information;

the step that the BM-SC performs the corresponding operation on the group triggering information to be updated includes that:

the BM-SC replaces the group triggering information to be updated with the new group triggering information when the updating operation type is the replacement; and the BM-SC deletes the group triggering information to be updated when the updating operation type is the cancelation.

Alternatively, when the updating operation type is the replacement, the request message for updating the triggering information of the MTC device group further includes: a valid time of the new group triggering information; and after the step that the BM-SC sends a response message of updating failure to the SCS, the method further includes that:

the BM-SC sends the new group triggering information to the MTC device group within the valid time of the new group triggering information, and notifies the SCS after sending successfully.

The present disclosure further provides a system for updating triggering information of an MTC device group, which includes: a BM-SC, and an SCS including a GCS AS; herein the SCS is arranged to connect with the BM-SC through the GCS AS, and send a request message for updating the triggering information of the MTC device group to the BM-SC; and the BM-SC is arranged to perform a corresponding operation on the group triggering information to be updated and send a response message of updating success to the SCS after completing the corresponding operation if the group triggering information to be updated has yet not been sent to an MTC device group and a valid time of the group triggering information to be updated has not been exceeded; and send a response message of updating failure to the SCS if the valid time of the group triggering information to be updated has been exceeded or the group triggering information to be updated has been sent to the MTC device group.

Alternatively, the request message for updating the triggering information of the MTC device group includes an updating ID for indicating an updating operation type;

the updating operation type includes any one of the following: replacement and cancelation;

when the updating operation type is the replacement, a message body of the request message for updating the triggering information of the MTC device group further includes: new group triggering information;

the BM-SC is arranged to perform a corresponding operation on the group triggering information to be updated, which refers to that:

the BM-SC replaces the group triggering information to be updated with the new group triggering information when the updating operation type is the replacement, and deletes the group triggering information to be updated when the updating operation type is the cancelation.

Alternatively, when the updating operation type is the replacement, the request message for updating the triggering information of the MTC device group further includes: a valid time of the new group triggering information; and the BM-SC is further arranged to, after sending the response message of updating failure to the SCS, send the new group triggering information to the MTC device group within the valid time of the new group triggering information, and notify the SCS after sending successfully.

The present disclosure further provides a device for updating triggering information of an MTC device group, which is located in a BM-SC, including:

a judgment module, arranged to judge whether the BM-SC has sent group triggering information to be updated to an MTC device group and whether a valid time of the group triggering information to be updated has been exceeded after a request message for updating the triggering information of the MTC device group, which is sent to the BM-SC by an SCS, is received; and a processing module, arranged to perform a corresponding operation on the group triggering information to be updated and send a response message of updating success to the SCS after completing the corresponding operation if a judgment result of the judgment module is that the group triggering information to be updated has yet not been sent to the MTC device group and the valid time of the group triggering information to be updated has not been exceeded; and send a response message of updating failure to the SCS if the judgment result of the judgment module is that the valid time of the group triggering information to be updated has been exceeded or the group triggering information to be updated has been sent to the MTC device group.

Alternatively, the request message for updating the triggering information of the MTC device group includes an updating ID for indicating an updating operation type;

the updating operation type includes any one of the following: replacement and cancelation;

when the updating operation type is the replacement, a message body of the request message for updating the triggering information of the MTC device group further includes: new group triggering information;

the processing module is arranged to perform the corresponding operation on the group triggering information to be updated, which refers to that:

the processing module replaces the group triggering information to be updated with the new group triggering information when the updating operation type is the replacement, and deletes the group triggering information to be updated when the updating operation type is the cancelation.

Alternatively, when the updating operation type is the replacement, the request message for updating the triggering information of the MTC device group further includes: a valid time of the new group triggering information; and the processing module is further arranged to, after the response message of updating failure is sent to the SCS, indicate the BM-SC to send the new group triggering information to the MTC device group within the valid time of the new group triggering information, and notify the SCS after the new group triggering information is sent successfully.

According to the solutions of the embodiment of the present disclosure, the triggering information of the MTC device group can be updated within the valid time of the group triggering information, and an updating result can be notified to a triggering information sending end, so a requirement of updating group triggering information in a 3GPP network is realized.

SPECIFIC EMBODIMENTS

The technical solutions of the present disclosure will be described below with reference to the drawings and embodiments in detail.

It needs to be noted that the embodiments of the present disclosure and various characteristics in the embodiments may be combined with each other under the condition of no conflicts, which falls within the scope of protection of the present disclosure. In addition, although logic sequences are shown in the flowcharts, shown or described steps may be executed in sequences different from the sequences shown here in some circumstances.

Embodiment One: a method for updating triggering information of an MTC device group includes that:

an SCS is connected with a BM-SC through a GCS AS, and sends a request message for updating triggering information of an MTC device group to the BM-SC; and the BM-SC performs a corresponding operation on the group triggering information to be updated and sends a response message of updating success to the SCS after completing the corresponding operation if the group triggering information to be updated has yet not been sent to an MTC device group and a valid time of the group triggering information to be updated has yet not been exceeded, and sends a response message of updating failure to the SCS if the valid time of the group triggering information to be updated has been exceeded or the group triggering information to be updated has been sent to the MTC device group.

In the present embodiment, when the triggering information of the MTC device group is required to be updated, the SCS sending the triggering information of the MTC device group to the BM-SC sends the request message for updating the triggering information of the MTC device group to the BM-SC again, and the BM-SC performs the corresponding processing according to a state of the group triggering information requested by the request message to be updated, and sends a corresponding updating response message to the SCS.

In the present embodiment, an MTC device refers to UE with an MTC function, and also has an MBMS receiving capability. The MTC device group refers to a group of MTC devices formed by two or more MTC devices. The MTC device group usually has the same MTC device group ID, and is located in the same geographic area.

In the present embodiment, the request message for updating the triggering information of the MTC device group may carry a group ID for uniquely identifying the MTC device group and a group triggering information number for distinguishing different group triggering information in the same group. The group triggering information to be updated may be uniquely determined by the group ID and the group triggering information number.

In an implementation mode of the present embodiment, the request message for updating the triggering information of the MTC device group may include an updating ID for indicating an updating operation type.

The updating operation type may include any one of the following: replacement and cancelation.

When the updating operation type is the replacement, a message body of the request message for updating the triggering information of the MTC device group further includes: new group triggering information.

The step that the corresponding operation is performed on the group triggering information to be updated includes that:

the group triggering information to be updated is replaced with the new group triggering information when the updating operation type is the replacement; and the group triggering information to be updated is deleted when the updating operation type is the cancelation.

In the present implementation mode, when the updating operation type is the replacement, the request message for updating the triggering information of the MTC device group may further include: a valid time of the new group triggering information.

After the step that the response message of updating failure is sent to the SCS, the method may further include that:

the new group triggering information is sent to the MTC device group within the valid time of the new group triggering information, and the SCS is notified after the new group triggering information is sent successfully.

Figure 3:
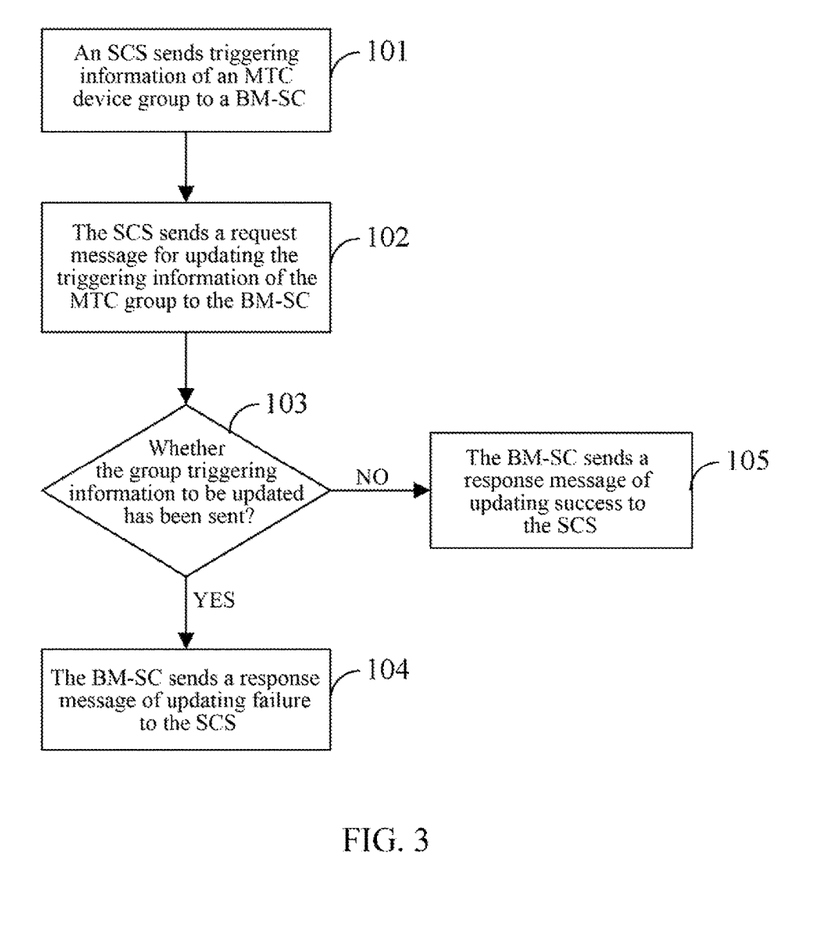
FIG. 3 is a flowchart of a method for updating triggering information of an MTC device group according to an example of embodiment one.

An example of the present embodiment, as shown in FIG. 3, includes the following steps 101~105.

In step 101, an SCS sends triggering information of an MTC device group to a BM-SC.

Specifically, the SCS sets a content of the triggering information of the MTC device group, and sends the triggering information of the MTC device group to the BM-SC; herein, the SCS is located in or outside a 3GPP network.

The content of the triggering information of the MTC device group at least includes: an MTC device group ID, a group triggering information number and a valid time. Herein the group ID is used to uniquely identify an MTC device group required to be triggered; and the group triggering information number is used to distinguish different group triggering information for the same group; and the valid time is used to indicate a valid time of the group triggering information in a 3GPP system, that is, the group triggering information is invalid if the valid time is exceeded.

The triggering information of the MTC device group may further include area information for indicating an area where a target MTC device group is located.

It needs to be noted that: the group triggering information received by the BM-SC includes triggering indication information, that is, the BM-SC determines that the received information is the group triggering information according to the triggering indication information.

The BM-SC maps the group ID in the triggering information of the MTC device group into a Temporary Mobile Group Identity TMGI. If the group triggering information includes the area information, the BM-SC maps the area information into an MBMS Service Area Identifier SAI or an MBMS over a Single Frequency Network MBSFN area ID or E-UTRAN Cell Global Identifier ECGI information.

The SCS may further include a GCS AS.

In step 102, the SCS sends a request message for updating the triggering information of the MTC device group to the BM-SC within a valid time of the group triggering information to be updated.

The request message at least includes the following contents: the group ID, the group triggering information number, the valid time and an updating ID. Herein, the group triggering information number is used to identify the original group triggering information required to be updated, and the updating ID is used to indicate that an updating operation type is any one of the following: replacement and cancelation. The replacement refers to that the original group triggering information is replaced with new group triggering information (carried in a message body of the request message), and the cancelation refers to that the original group triggering information is cancelled.

In step 103, the BM-SC judges whether the group triggering information has been sent, and if YES, Step 104 is executed, and if NO, Step 105 is executed.

Specifically, the BM-SC judges whether the original group triggering information (i.e. the group triggering information to be updated) has been sent to the MTC device group through an MBMS-GateWay MBMS-GW.

In step 104, the BM-SC sends a response message of updating failure to the SCS.

The BM-SC notifies the SCS of an updating request failure if the BM-SC has sent the original group triggering information to the MTC device group.

It needs to be noted that the BM-SC may continue sending new group triggering information after a replacement operation to the MTC device group if the updating operation type is the replacement; and the BM-SC only sends the response message of updating failure to the SCS if the updating operation type is the cancelation.

In step 105, the BM-SC sends a response message of updating success to the SCS.

The BM-SC does not send the original group triggering information, that is, the BM-SC locally stores it. If the updating is the replacement, the BM-SC deletes the local original group triggering information, replaces the original group triggering information with the new group triggering information, and sends the new group triggering information after the replacement to the MTC device group. If the updating is the cancelation, the BM-SC deletes the local original group triggering information. The response message of updating success is sent to the SCS after successful deletion or replacement.

Figure 4:
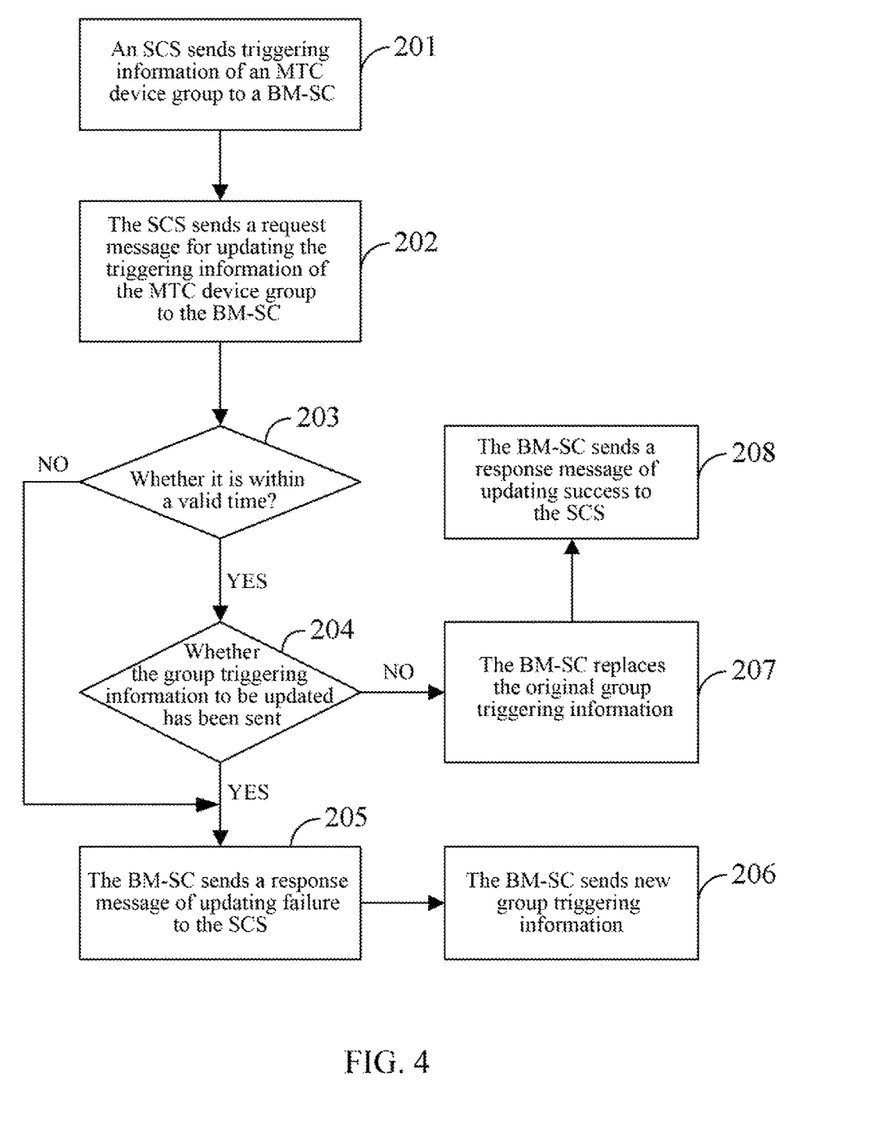
FIG. 4 is a flowchart of a scenario of replacing original group triggering information with new group triggering information according to the embodiment one.

Another example of the present embodiment is aimed at a scenario of replacing original group triggering information with new group triggering information, and as shown in FIG. 4, the example includes the following steps 201~208.

In step 201, an SCS sends group triggering information to a BM-SC.

In the step, the SCS is located in a 3GPP network or outside the 3GPP network.

The Group triggering refers to that a target MTC device ID is a group ID.

The BM-SC authenticates the received group triggering information, that is, the BM-SC judges whether to accept the group triggering information according to a local database or an HSS.

In step 202, the SCS sends a request message for updating triggering information of the MTC device group to the BM-SC.

The request message, sent by the SCS, for updating the triggering information of the MTC device group at least includes: a group ID, a group triggering information number, a valid time and an updating ID. Herein, the group triggering information number is used to indicate the original group triggering information required to be updated, and the updating ID is replacement, and the valid time is a valid time of new group triggering information; and a message body of the request message further includes the new group triggering information.

In step 203, whether a valid time of the group triggering information to be updated has yet been exceeded is judged, and if YES, step 204 is executed, and if the valid time has been exceeded, the step 205 is executed.

Specifically, the BM-SC makes a judgment according to a valid time parameter of the original group triggering information.

In step 204, the BM-SC judges whether the group triggering information to be updated has been sent, and if YES, step 205 is executed, and if NO, step 207 is executed.

The BM-SC determines whether the group triggering information to be updated has been sent according to the group triggering information number in the request message.

In another example, it is not necessary that judgments are made according to a sequence of step 203 and step 204. Whether the group triggering information to be updated has been sent may be judged at first, and whether the valid time has been exceeded and whether the group triggering information to be updated has been sent may also be judged at the same time.

In step 205, the BM-SC sends a response message of updating failure to the SCS.

If the BM-SC determines that the group triggering information to be updated has been sent, the response message of updating failure is sent to the SCS. The response message of updating failure includes a failure reason indication, and a failure reason here is that the group triggering information to be updated has been sent.

If the BM-SC determines that the request message has exceeded the valid time of the group triggering information to be updated, the updating failure message is sent to the SCS. The response message of updating failure includes the failure reason indication, and the failure reason here is that the valid time has been exceeded.

When the updating ID is the replacement, step 206 is executed after the step.

In Step 206, the BM-SC sends new group triggering information to an MTC device group.

The BM-SC sends the new group triggering information to the MTC device group within a valid time of the new group triggering information.

The SCS is notified after the new group triggering information is sent successfully, for example, which is not limited to, returning a sending success response message to the SCS.

In step 207, the BM-SC deletes the original group triggering information, and sends the new group triggering information.

If the BM-SC determines that the group triggering information to be updated has not yet been sent, that is, the BM-SC locally stores it, the BM-SC deletes the original group triggering information, and replaces it with the new group triggering information, and sends the new group triggering information to the MTC device group within the valid time of the new group triggering information.

In step 208, the BM-SC sends a response message of updating success to the SCS.

Figure 5:
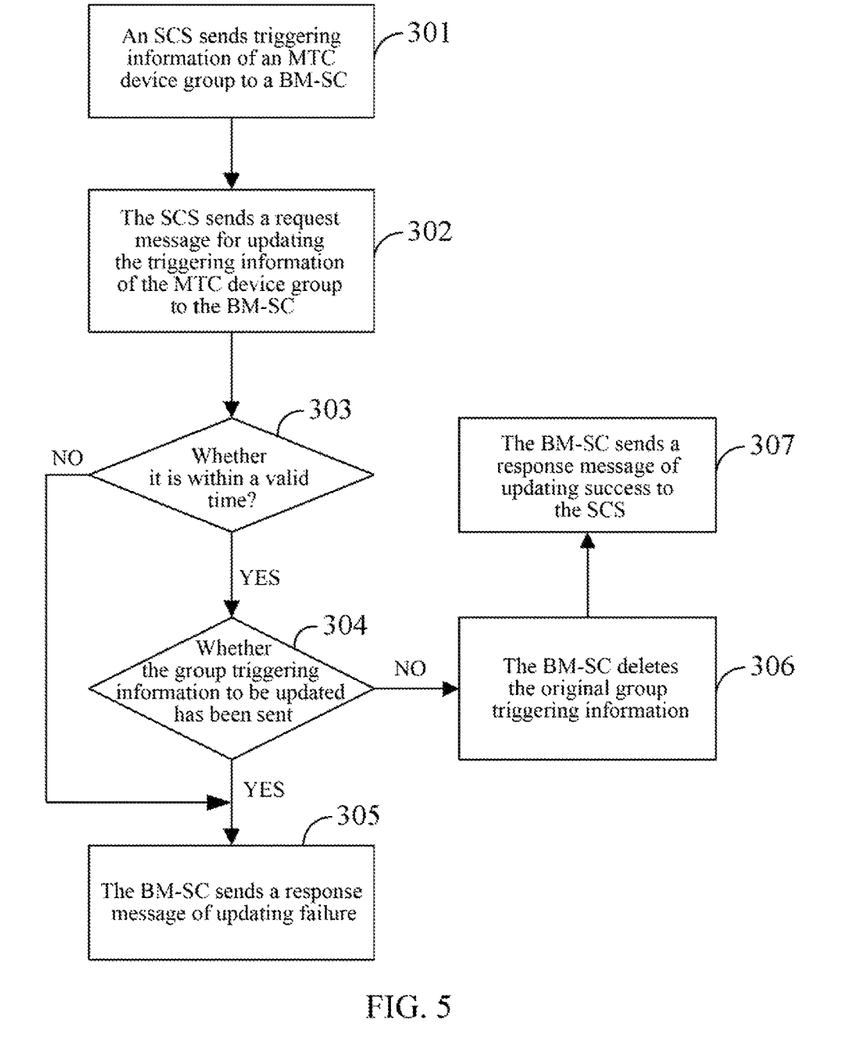
FIG. 5 is a flowchart of a scenario of canceling original group triggering information according to the embodiment one.

Another example of the present embodiment is aimed at a scenario of canceling triggering information of an MTC device group, and as shown in FIG. 5, the example includes the following steps 301~307.

In step 301, an SCS sends group triggering information to a BM-SC.

In the step, the SCS is located in a 3GPP network or outside the 3GPP network.

The Group triggering refers to that a target MTC device ID is a group ID.

The BM-SC authenticates the received group triggering information, that is, the BM-SC judges whether to accept the group triggering information according to a local database or an HSS.

In step 302, the SCS sends a request message for updating the triggering information of the MTC device group to the BM-SC.

The request message sent by the SCS at least includes: a group ID, a group triggering information number, a valid time and an updating ID. Herein, the group triggering information number is used to indicate the original group triggering information required to be updated, and the updating ID is the cancelation, and the valid time is a valid time of the group triggering information to be updated.

In step 303, whether a valid time of the group triggering information to be updated has been exceeded is judged, and if YES, step 304 is executed, and otherwise, step 305 is executed.

Specifically, the BM-SC makes a judgment according to a valid time parameter of the original group triggering information.

In step 304, the BM-SC judges whether the group triggering information has been sent, and if YES, step 305 is executed, and if NO, Step 306 is executed.

The BM-SC determines whether the group triggering information to be updated has been sent according to the group triggering information number in the request message.

In another example, it is not necessary that judgments are made according to a sequence of step 303 and step 304, and whether the group triggering information to be updated has been sent may be judged at first, and whether the valid time has been exceeded and whether the group triggering information to be updated has been sent may also be judged at the same time.

In step 305, the BM-SC sends a response message of updating failure to the SCS.

If the BM-SC determines that the group triggering information to be updated has been sent, the response message of updating failure is sent to the SCS. The response message of updating failure includes a failure reason indication, and a failure reason here is that the group triggering information to be updated has been sent.

If the BM-SC determines that the request message has exceeded the valid time of the group triggering information to be updated, the updating failure message is sent to the SCS. The response message of updating failure includes the failure reason indication, and the failure reason here is that the valid time has been exceeded.

In step 306, the BM-SC deletes the group triggering information to be updated.

If the BM-SC determines that the group triggering information to be updated has yet not been sent, that is, the BM-SC locally stores it, the BM-SC deletes the original group triggering information.

In step 307, the BM-SC sends a response message of updating success to the SCS.

Embodiment Two: a method for updating triggering information of an MTC device group includes that:

a BM-SC judges whether group triggering information to be updated has been sent to an MTC device group and whether a valid time of the group triggering information to be updated has been exceeded after receiving a request message for updating the triggering information of the MTC device group, which is sent by an SCS; and the BM-SC performs a corresponding operation on the group triggering information to be updated and sends a response message of updating success to the SCS after completing the corresponding operation if the group triggering information to be updated has yet not been sent to the MTC device group and the valid time of the group triggering information to be updated has yet not been exceeded; and sends a response message of updating failure to the SCS if the valid time of the group triggering information to be updated has been exceeded or the group triggering information to be updated has been sent to the MTC device group.

In an implementation mode of the present embodiment, the request message for updating the triggering information of the MTC device group may include an updating ID for indicating an updating operation type.

The updating operation type may include any one of the following: replacement and cancelation.

When the updating operation type is the replacement, a message body of the request message for updating the triggering information of the MTC device group may further include: new group triggering information.

The step that the BM-SC performs a corresponding operation on the group triggering information to be updated may include that:

the BM-SC replaces the group triggering information to be updated with the new group triggering information when the updating operation type is the replacement; and the BM-SC deletes the group triggering information to be updated when the updating operation type is the cancelation.

In the present implementation mode, when the updating operation type is the replacement, the request message for updating the triggering information of the MTC device group may further include: a valid time of the new group triggering information.

After the step that the BM-SC sends the response message of updating failure to the SCS, the method may further include that:

the BM-SC sends the new group triggering information to the MTC device group within the valid time of the new group triggering information, and notifies the SCS after sending successfully.

Other implementation details may refer to the embodiment one.

Figure 6:
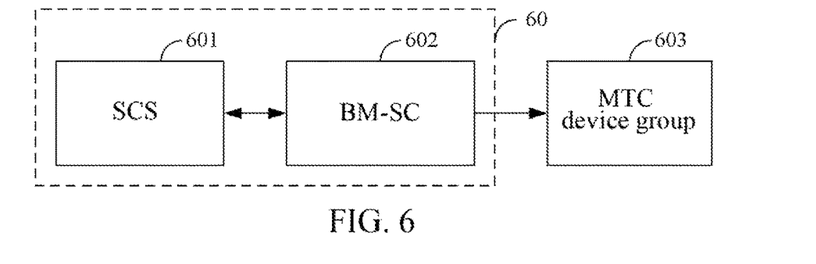
FIG. 6 is a structure diagram of a system for updating triggering information of an MTC device group according to embodiment two.

Embodiment Three: a system for updating triggering information of an MTC device group, and as shown in FIG. 6, the system 60 includes: a BM-SC 602, and an SCS 601 including a GCS AS.

The SCS 601 is connected with the BM-SC through the GCS AS, and is used to send a request message for updating triggering information of the MTC device group to the BM-SC 602. The BM-SC is used to perform a corresponding operation on the group triggering information to be updated and send a response message of updating success to the SCS 601 after completing the corresponding operation if the group triggering information to be updated has yet not been sent to an MTC device group 603 and a valid time of the group triggering information to be updated has yet not been exceeded; and send a response message of updating failure to the SCS 601 if the valid time of the group triggering information to be updated has been exceeded or the group triggering information to be updated has been sent to the MTC device group 603.

In the present embodiment, the SCS 601 is further used to generate the MTC group triggering information and send it to the BM-SC 602, and is further used to receive the updating success/failure response message sent by the BM-SC 602.

The BM-SC 602 packages the group triggering information into MBMS information and sends to the MTC device group 603 when sending the group triggering information.

An MTC user device in the MTC device group 603 may be an MTC access gateway or a single MTC device.

In an implementation mode of the present embodiment, the request message for updating the triggering information of the MTC device group may include an updating ID for indicating an updating operation type.

The updating operation type may include any one of the following: replacement and cancelation.

When the updating operation type is the replacement, a message body of the request message for updating the triggering information of the MTC device group may further include: new group triggering information.

The BM-SC performs the corresponding operation on the group triggering information to be updated, which may refer to that:

the BM-SC replaces the group triggering information to be updated with the new group triggering information when the updating operation type is the replacement; and deletes the group triggering information to be updated when the updating operation type is the cancelation.

In the present implementation mode, when the updating operation type is the replacement, the request message for updating the triggering information of the MTC device group may further include: a valid time of the new group triggering information.

The BM-SC may further be used to, after sending the response message of updating failure to the SCS, send the new group triggering information to the MTC device group within the valid time of the new group triggering information, and notify the SCS after sending successfully.

Other implementation details may refer to the embodiment one.

Embodiment Four: a device for updating triggering information of an MTC device group is located in a BM-SC and includes:

a judgment module, used to judge whether the BM-SC has sent group triggering information to be updated to an MTC device group and whether a valid time of the group triggering information to be updated has been exceeded after a request message, sent to the BM-SC by an SCS, for updating the triggering information of the MTC device group is received; and a processing module, used to perform a corresponding operation on the group triggering information to be updated and send a response message of updating success to the SCS after completing the corresponding operation if a judgment result of the judgment module indicates that the group triggering information to be updated has yet not been sent to the MTC device group and the valid time of the group triggering information to be updated has yet not been exceeded; and send a response message of updating failure to the SCS if the judgment result of the judgment module indicates that the valid time of the group triggering information to be updated has been exceeded or the group triggering information to be updated has been sent to the MTC device group.

In an implementation mode of the present embodiment, the request message for updating the triggering information of the MTC device group may include an updating ID for indicating an updating operation type.

The updating operation type may include any one of the following: replacement and cancelation.

When the updating operation type is the replacement, a message body of the request message for updating the triggering information of the MTC device group may further include: new group triggering information.

The processing module performs a corresponding operation on the group triggering information to be updated, which may refer to that:

the processing module replaces the group triggering information to be updated with the new group triggering information when the updating operation type is the replacement, and deletes the group triggering information to be updated when the updating operation type is the cancelation.

In the present implementation mode, when the updating operation type is the replacement, the request message for updating the triggering information of the MTC device group may further include: a valid time of new group triggering information.

The processing module may further be used to, after the response message of updating failure is sent to the SCS, indicate the BM-SC to send the new group triggering information to the MTC device group within the valid time of the new group triggering information and notify the SCS after the new group triggering information is sent successfully.

Other implementation details may refer to the embodiment one.

It is apparent that the present disclosure may also have multiple other embodiments, and those skilled in the art may make various corresponding variations and transformations according to the present disclosure without departing from the rule and essence of the present disclosure, and these corresponding variations and transformations shall fall within the scope of protection of the claims of the present disclosure.

INDUSTRIAL APPLICABILITY

According to the solutions of the embodiment of the present disclosure, the triggering information of the MTC device group may be updated within the valid time of the group triggering information, and the updating result may be notified to a triggering information sending end, so the requirement of updating the group triggering information in the 3GPP network is realized.

What I claim is:

1. A method for updating triggering information of a Machine Type Communication, MTC, device group, comprising:

judging, by a Broadcast Multicast Service Center, BM-SC, whether group triggering information to be updated has been sent to the MTC device group and whether a valid time of the group triggering information to be updated has been exceeded after receiving a request message for updating the triggering information of the MTC device group, which is sent by a Service Capability Server, SCS; and performing an updating operation on the group triggering information to be updated, and sending a response message of updating success to the SCS by the BM-SC after completing the updating operation if the group triggering information to be updated has not yet been sent to the MTC device group and the valid time of the group triggering information to be updated has not been exceeded; and sending a response message of updating failure to the SCS by the BM-SC if the valid time of the group triggering information to be updated has been exceeded or the group triggering information to be updated has been sent to the MTC device group.

2. The method according to claim 1, wherein the request message for updating the triggering information of the MTC device group comprises an updating Identifier for indicating an updating operation type;

the updating operation type comprises any one of the following: replacement and cancelation;

when the updating operation type is the replacement, a message body of the request message for updating the triggering information of the MTC device group further comprises: new group triggering information;

the step of performing an updating operation on the group triggering information to be updated by the BM-SC, comprises:

replacing, by the BM-SC, the group triggering information to be updated with the new group triggering information when the updating operation type is the replacement; and deleting, by the BM-SC, the group triggering information to be updated when the updating operation type is the cancelation.

3. The method according to claim 2, wherein when the updating operation type is the replacement, the request message for updating the triggering information of the MTC device group further comprises: a valid time of the new group triggering information; and after the step of sending a response message of updating failure to the SCS by the BM-SC, the method further comprises:

sending the new group triggering information to the MTC device group within the valid time of the new group triggering information, and notifying the SCS by the BM-SC after sending successfully.

4. A system for updating triggering information of a Machine Type Communication, MTC, device group, wherein, the system comprises: a Broadcast Multicast Service Center, BM-SC, and a Service Capability Server, SCS, comprising a Group Communication Service Application Server, GCS AS, wherein the SCS is arranged to connect with the BM-SC through the GCS AS, and send a request message for updating the triggering information of the MTC device group to the BM-SC; and the BM-SC is arranged to perform an updating operation on the group triggering information to be updated and send a response message of updating success to the SCS after completing the updating operation if the group triggering information to be updated has not yet been sent to the MTC device group and a valid time of the group triggering information to be updated has not been exceeded; and send a response message of updating failure to the SCS if the valid time of the group triggering information to be updated has been exceeded or the group triggering information to be updated has been sent to the MTC device group.

5. The system according to claim 4, wherein the request message for updating the triggering information of the MTC device group comprises an updating Identifier for indicating an updating operation type;

the updating operation type comprises any one of the following: replacement and cancelation;

when the updating operation type is the replacement, a message body of the request message for updating the triggering information of the MTC device group further comprises: new group triggering information;

the BM-SC is arranged to perform an updating operation on the group triggering information to be updated, which refers to that:

the BM-SC replaces the group triggering information to be updated with the new group triggering information when the updating operation type is the replacement, and deletes the group triggering information to be updated when the updating operation type is the cancelation.

6. The system according to claim 5, wherein, when the updating operation type is the replacement, the request message for updating the triggering information of the MTC device group further comprises: a valid time of the new group triggering information; and the BM-SC is further arranged to, after sending the response message of updating failure to the SCS, send the new group triggering information to the MTC device group within the valid time of the new group triggering information, and notify the SCS after sending successfully.

7. A device for updating triggering information of a Machine Type Communication, MTC, device group, wherein, the device is located in a Broadcast Multicast Service Center, BM-SC, and the device comprises a storage and a computer, the storage stores instructions that when executed by the computer cause the computer to:

judge whether the BM-SC has sent group triggering information to be updated to an MTC device group and whether a valid time of the group triggering information to be updated has been exceeded after a request message, for updating the triggering information of the MTC device group, which is sent to the BM-SC by a Service Capability Server, SCS, is received; and perform a corresponding operation on the group triggering information to be updated, and send a response message of updating success to the SCS after completing the corresponding operation if a judgment result is that the group triggering information to be updated has not yet been sent to the MTC device group and the valid time of the group triggering information to be updated has not been exceeded; and send a response message of updating failure to the SCS if the judgment result is that the valid time of the group triggering information to be updated has been exceeded or the group triggering information to be updated has been sent to the MTC device group.

8. The device according to claim 7, wherein the request message for updating the triggering information of the MTC device group comprises an updating Identifier for indicating an updating operation type;

the updating operation type comprises any one of the following: replacement and cancelation;

when the updating operation type is the replacement, a message body of the request message for updating the triggering information of the MTC device group further comprises: new group triggering information;

the computer is caused to perform an updating operation on the group triggering information to be updated, which refers to that:

the computer replaces the group triggering information to be updated with the new group triggering information when the updating operation type is the replacement, and deletes the group triggering information to be updated when the updating operation type is the cancelation.

9. The device according to claim 8, wherein when the updating operation type is the replacement, the request message for updating the triggering information of the MTC device group further comprises: a valid time of the new group triggering information; and the computer is further caused to, after the response message of updating failure is sent to the SCS, indicate the BM-SC to send the new group triggering information to the MTC device group within the valid time of the new group triggering information and notify the SCS after the new group triggering information is sent successfully.

* * * * *